(12) United States Patent
Bressler et al.

(10) Patent No.: US 11,704,858 B2
(45) Date of Patent: Jul. 18, 2023

(54) METHOD AND SYSTEM FOR DIFFUSING COLOR ERROR INTO ADDITIVE MANUFACTURED OBJECTS

(71) Applicant: Stratasys Ltd., Rehovot (IL)

(72) Inventors: Yoav Bressler, Tel-Aviv (IL); Shai Lipowitch, Petach-Tikva (IL); Shahar Klinger, Rehovot (IL); Mayan Rumbak, Mazkeret Batia (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 17/887,462

(22) Filed: Aug. 14, 2022

(65) Prior Publication Data

US 2022/0392143 A1 Dec. 8, 2022

Related U.S. Application Data

(63) Continuation of application No. 17/280,894, filed as application No. PCT/IL2019/051071 on Sep. 27, 2019, now Pat. No. 11,417,047.

(Continued)

(51) Int. Cl.
*G06T 15/04* (2011.01)
*G06T 7/529* (2017.01)
(Continued)

(52) U.S. Cl.
CPC ............ *G06T 15/04* (2013.01); *B29C 64/112* (2017.08); *B29C 64/393* (2017.08); *G06T 7/529* (2017.01);
(Continued)

(58) Field of Classification Search
CPC ....... G06T 15/04; G06T 7/529; G06T 11/001; B29C 64/386–393; B29C 64/112; B33Y 10/00; B33Y 50/02
See application file for complete search history.

(56) References Cited

U.S. PATENT DOCUMENTS 6,259,962 B1 7/2001 Gothait
6,569,373 B2 5/2003 Napadensky
(Continued)

FOREIGN PATENT DOCUMENTS

| EP | 3023229 | 5/2016 |
|---|---|---|
| WO | WO 2015/111059 | 7/2015 |
| WO | WO 2020/065656 | 4/2020 |

OTHER PUBLICATIONS

International Preliminary Report on Patentability dated Apr. 8, 2021 From the International Bureau of WIPO Re. Application No. PCT/IL2019/051071. (8 Pages).

(Continued)

*Primary Examiner* — Matthew J Daniels
*Assistant Examiner* — Andrew L Swanson

(57) ABSTRACT

A method of processing data for additive manufacturing of a 3D object comprises: receiving graphic elements defining a surface of the object, and an input color texture to be visible over a surface of the object; transforming the elements to voxelized computer object data; constructing a 3D color map having a plurality of pixels, each being associated with a voxel and being categorized as either a topmost pixel or an internal pixel. Each topmost pixel is associated with a group of internal pixels forming a receptive field for the topmost pixel. A color-value is assigned to each topmost pixel and each internal pixel of a receptive field associated with the topmost pixel, based on the color texture and according to a subtractive color mixing. A material to be used during the additive manufacturing is designated based on the color-value.

10 Claims, 11 Drawing Sheets

Related U.S. Application Data

(60) Provisional application No. 62/737,931, filed on Sep. 28, 2018.

(51) Int. Cl.

| | | |
|---|---|---|
| *B29C 64/112* | (2017.01) | |
| *B29C 64/393* | (2017.01) | |
| *G06T 11/00* | (2006.01) | |
| *B33Y 10/00* | (2015.01) | |
| *B33Y 50/02* | (2015.01) | |

(52) U.S. Cl.
CPC ............ *G06T 11/001* (2013.01); *B33Y 10/00* (2014.12); *B33Y 50/02* (2014.12)

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 6,863,859 B2 | 3/2005 | Levy |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,500,846 B2 | 3/2009 | Eshed et al. |
| 7,991,498 B2 | 8/2011 | Kritchman |
| 9,031,680 B2 | 5/2015 | Napadensky |
| 2010/0191360 A1 | 7/2010 | Napadensky et al. |
| 2015/0258770 A1 | 9/2015 | Chan et al. |
| 2016/0151979 A1* | 6/2016 | Urban ................... B29C 64/112 425/130 |
| 2016/0339643 A1* | 11/2016 | Dikovsky ................ H04N 1/60 |
| 2017/0173886 A1 | 6/2017 | Menchick et al. |
| 2018/0036951 A1 | 2/2018 | Harayama |
| 2018/0108170 A1* | 4/2018 | Matsubara .............. G06T 15/08 |
| 2018/0229447 A1 | 8/2018 | Mantell et al. |
| 2021/0358196 A1 | 11/2021 | Bressler et al. |

OTHER PUBLICATIONS

International Search Report and the Written Opinion dated Jan. 21, 2020 From the International Searching Authority Re. Application No. PCT/IL2019/051071. (13 Pages).

Notice of Allowance dated Apr. 13, 2022 from US Patent and Trademark Office Re. U.S. Appl. No. 17/280,894. (7 pages).

Official Action dated Nov. 18, 2021 from the US Patent and Trademark Office Re. U.S. Appl. No. 17/280,894. (19 pages).

Communication Pursuant to Article 94(3) EPC dated Nov. 18, 2022 From the European Patent Office Re. Application No. 19794708.8. (7 pages).

* cited by examiner

| | |
|---|---|
| surface color 1 | set 1-1 of color assignment rules<br>set 1-2 of color assignment rules<br>⋮<br>set 1-$N_1$ of color assignment rules |
| surface color 2 | set 2-1 of color assignment rules<br>set 2-2 of color assignment rules<br><br>set 2-$N_2$ of color assignment rules |
| | ⋮ |
| surface color M | set M-1 of color assignment rules<br>set M-2 of color assignment rules<br>⋮<br>set M-$N_M$ of color assignment rules |

FIG. 8

METHOD AND SYSTEM FOR DIFFUSING COLOR ERROR INTO ADDITIVE MANUFACTURED OBJECTS

RELATED APPLICATIONS

This application is a continuation of U.S. patent application Ser. No. 17/280,894 filed on Mar. 28, 2021, which is a National Phase of PCT Patent Application No. PCT/IL2019/051071 having International Filing Date of Sep. 27, 2019, which claims the benefit of priority under 35 USC 119(e) of U.S. Provisional Patent Application No. 62/737,931 filed on Sep. 28, 2018. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to a method and system for diffusing color error into an additive manufactured object.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having an array of nozzles to deposit layers on a building tray or platform (tray). Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846, 7,991,498 and 9,031,680, and U.S. Published Application No. 20160339643, all by the same Assignee, and being hereby incorporated by reference in their entirety.

In AM of opaque colored objects, it is recognized that the overall perceived color is contributed by the surface layers and layers immediately underneath the surface layers.

U.S. Published Application No. 20160339643 teaches that in AM coloring may exhibit tint deviations over the different regions of the manufactured object due to a cross-talk between proximate surfaces of thin geometries. The disclosure accounts for the expected color deviations and teaches modulating the color composition by relating the color as it appears in a point on the surface to the composition of the underlying color stack.

U.S. Published Application No. 20180036951 discloses generating cross-section data including colored region data representing cross-sections of a colored region of the object. The cross-section data are based on model data that represent the color of the surface of the object in a multi-level gradation, and each of the colored region data represents a color in a lower level of gradation.

SUMMARY OF THE INVENTION

According to an aspect of some embodiments of the present invention there is provided a method of processing data for additive manufacturing of a three-dimensional object. The method comprises: receiving a plurality of graphic elements defining a surface of the object, and an input color texture to be visible over a surface of the object; transforming the graphic elements to a grid of voxels defining a shape of the object, thereby providing computer object data; constructing a three-dimensional color map having a plurality of pixels, each pixel being associated with a voxel of the computer object data and being categorized as either a topmost pixel or an internal pixel, wherein each topmost pixel is associated with a group of internal pixels forming a receptive field for the topmost pixel; assigning a color-value to each topmost pixel and each internal pixel of a receptive field associated with the topmost pixel, based on the color texture and on a subtractive color mixing of the topmost pixel with the receptive field; and for each pixel, designating, based on the color-value, a material to be used for forming a voxel corresponding to the pixel during the additive manufacturing.

According to some embodiments of the invention the color-value is selected such that the subtractive color mixing, reproduces a respective portion of the input color texture within less than 10 $\Delta E^*$ units.

According to some embodiments of the invention the three-dimensional color map has a uniform depth thereacross.

According to some embodiments of the invention the three-dimensional color map has a non-uniform depth thereacross.

According to some embodiments of the invention the method comprises selecting a local depth of the map based on a curvature of the surface of the object.

According to some embodiments of the invention the selecting the local depth comprises selecting a lower depth for convex regions of the surface than for concave regions of the surface.

According to some embodiments of the invention the designating comprises designating more opaque colors for convex regions of the surface than for concave regions of the surface, wherein the selection of the local depth comprises selecting a higher depth for the convex regions than for the concave regions.

According to some embodiments of the invention the method comprises selecting a local depth of the map based on local opacity of the input color texture, wherein higher depth is selected for lesser local opacity of the input color texture.

According to some embodiments of the invention the depth of the map is equivalent to object depth of at most 1 mm.

According to some embodiments of the invention, the method comprises for at least one internal pixel of the map, selecting a receptive field of the internal pixel from at least two receptive fields associated with different topmost pixels of the map.

According to some embodiments of the invention the selecting the receptive field is according to a predetermined statistical distribution.

According to some embodiments of the invention the assigning the color-value comprises determining a local surface color corresponding to a portion of the input color texture associated with the receptive field, accessing a computer readable medium containing a color assignment database having a plurality of entries, each having surface color and a plurality of sets of color assignment rules for the surface color, and selecting from the database a set of color assignment rules corresponding to the determined a local surface color.

According to some embodiments of the invention at least one of the plurality of sets of color assignment rules comprises a set of depth-dependent color assignment rules.

According to some embodiments of the invention the selecting the set of color assignment rules is executed to ensure that at least two different sets of color assignment rules are respectively selected for at least two different internal pixels that belong to the same receptive field.

According to some embodiments of the invention the method comprises storing in a memory, for each pixel of the map, respective receptive field and respective depth.

According to some embodiments of the invention the method comprises removing at least one of the respective receptive field and respective depth, following the assignment of the color-value thereto.

According to some embodiments of the invention each of at least a portion of the internal pixel of the group is closer to the topmost pixel than to all other topmost pixels.

According to some embodiments of the invention the method comprises, for each group of pixels forming the receptive field, identifying a corresponding group of voxels of the computer object data, and determining a geometrical characteristic of the group of voxels, wherein the assigning the color-value is also based on the geometrical characteristic.

According to some embodiments of the invention for at least one pixel, the assignment of the color-value is based on color error information extracted from another pixel in the group.

According to some embodiments of the invention the color-value has a lower level of gradation than the input color texture.

According to some embodiments of the invention the input color texture comprises multibit color words, and the color-value is a single-bit color-value.

According to an aspect of some embodiments of the present invention there is provided a method of processing data for additive manufacturing of a three-dimensional object, the data being arranged over a plurality of graphic elements defining a surface of the object. The method comprises: slicing the data to form computer object data having a grid of voxels defining a plurality of slices, each having a plurality of voxels describing a layer of the three-dimensional object; accessing a computer readable medium storing a three-dimensional color map having a plurality of pixels, each being associated with a color-value; for at least one slice, associating a pixel of the three-dimensional color map to a voxel of the slice, and designating, based on a color-value of the pixel, a material to be used for forming the voxel during the additive manufacturing.

According to some embodiments of the invention the method comprises, for each voxel of at least a portion of the voxels, generating dispensing instructions readable by a controller of additive manufacturing system based on the designation and transmitting the dispensing instructions to the controller.

According to an aspect of some embodiments of the present invention there is provided a method of additive manufacturing an object. The method comprises: executing the method of processing data as delineated above and optionally and preferably as further detailed below; and dispensing and solidifying a plurality of materials based on the dispensing instructions to sequentially form a plurality of hardened layers in a configured pattern corresponding to a shape of an object.

According to an aspect of some embodiments of the present invention there is provided a computer software product, comprising a computer-readable medium in which program instructions are stored, which instructions, when read by a data processor, cause the data processor to execute the method as delineated above and optionally and preferably as further detailed below.

According to an aspect of some embodiments of the present invention there is provided a computerized controller of an additive manufacturing system, the computerized controller comprises a designated circuit configured for executing the method as delineated above and optionally and preferably as further detailed below.

According to an aspect of some embodiments of the present invention there is provided a system for fabricating a three-dimensional object by additive manufacturing, the system comprising the computerized controller.

According to an aspect of some embodiments of the present invention there is provided a system for processing data for additive manufacturing of a three-dimensional object, the system comprises a data processor configured for executing the method of processing data as delineated above and optionally and preferably as further detailed below to provide processed computer object data.

According to an aspect of some embodiments of the present invention there is provided a system for fabricating a three-dimensional object by additive manufacturing. The system comprises the system for processing data; a plurality of dispensing heads, having a plurality of dispensing heads configured for dispensing a plurality of modeling material formulations; a solidification system configured for solidifying each of the materials; and a computerized controller having a circuit configured for operating the dispensing heads and the solidification system to sequentially dispense and solidify a plurality of layers according to the processed computer object data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 8 is a schematic illustration of an example color assignment database, according to some embodiments of the present invention;

DESCRIPTION OF SPECIFIC EMBODIMENTS OF THE INVENTION

Figure 1A:
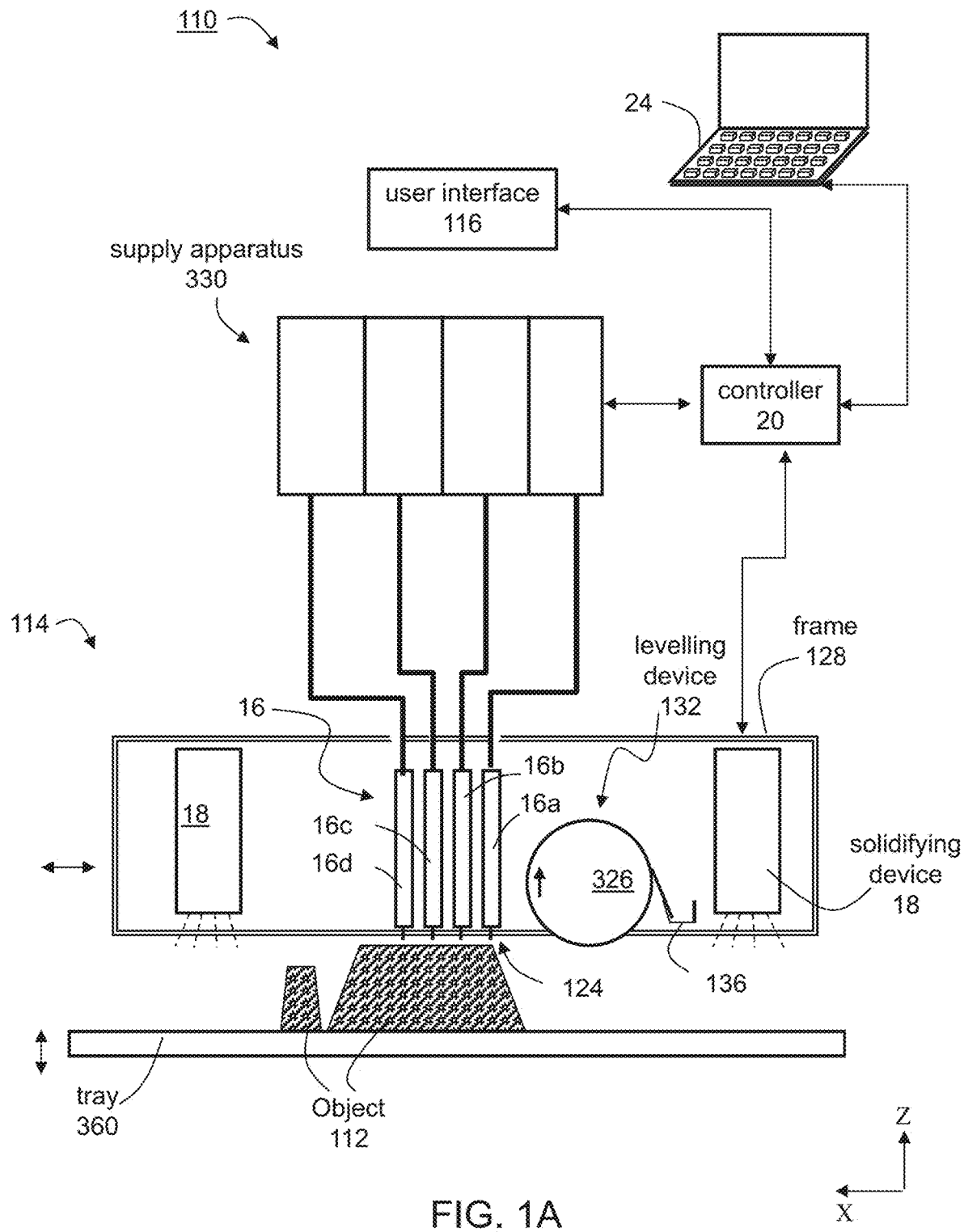
FIGS. 1A-1D are schematic illustrations of additive manufacturing systems according to some embodiments of the invention.

The present invention, in some embodiments thereof, relates to additive manufacturing and, more particularly, but not exclusively, to a method and system for diffusing color error into an additive manufactured object.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). Computer files storing these formats can in some embodiments of the present invention contain information pertaining to the color of the objects. Alternatively, the color information can be stored in separate image files, in which case the computer file that stores the computer object data format is associated with one or more of such separate image files. Such association can be by file name, URL or the like.

The term "object" as used herein refers to a whole object or a part thereof.

In the art of computer object data, an "object" can be interchangeably referred to as "part" or "shape."

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having an array of nozzles to deposit building material formulation in layers on a tray. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves for building a matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different dispensing head or different array of dispensing head nozzles of the AM. The material formulations are optionally and preferably deposited in layers during the same pass of the printing heads. The material formulations and combination of material formulations within the layer are selected according to the desired properties of the object.

Figure 2A:
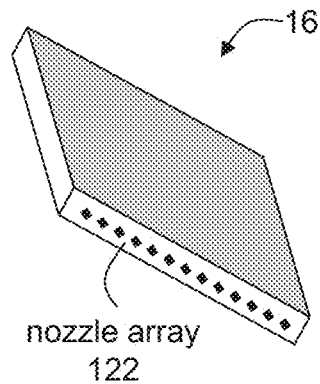
FIGS. 2A-2C are schematic illustrations of printing heads according to some embodiments of the present invention.
Figure 2B:
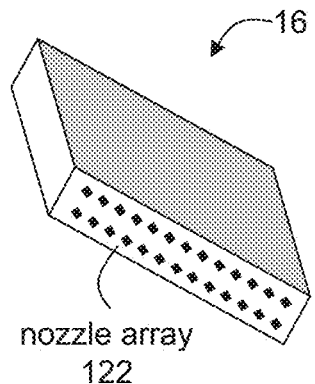
Figure 2C:
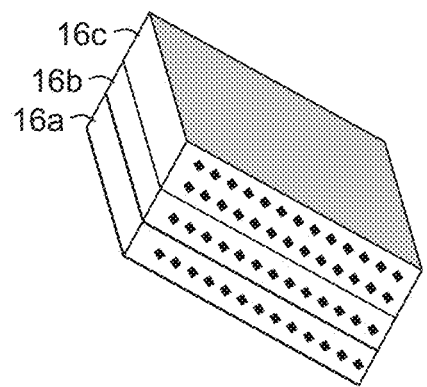

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-2C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via a building material formulation reservoir which may optionally include a temperature control unit (e.g., a temperature sensor and/or a heating device), and a material formulation level sensor. To dispense the building material formulation, a voltage signal is applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for depositing support material formulation.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein the term "about" refers to ±10%.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

The dispensing head(s) and radiation source(s) are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction, also referred to as the built direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

Figure 1B:
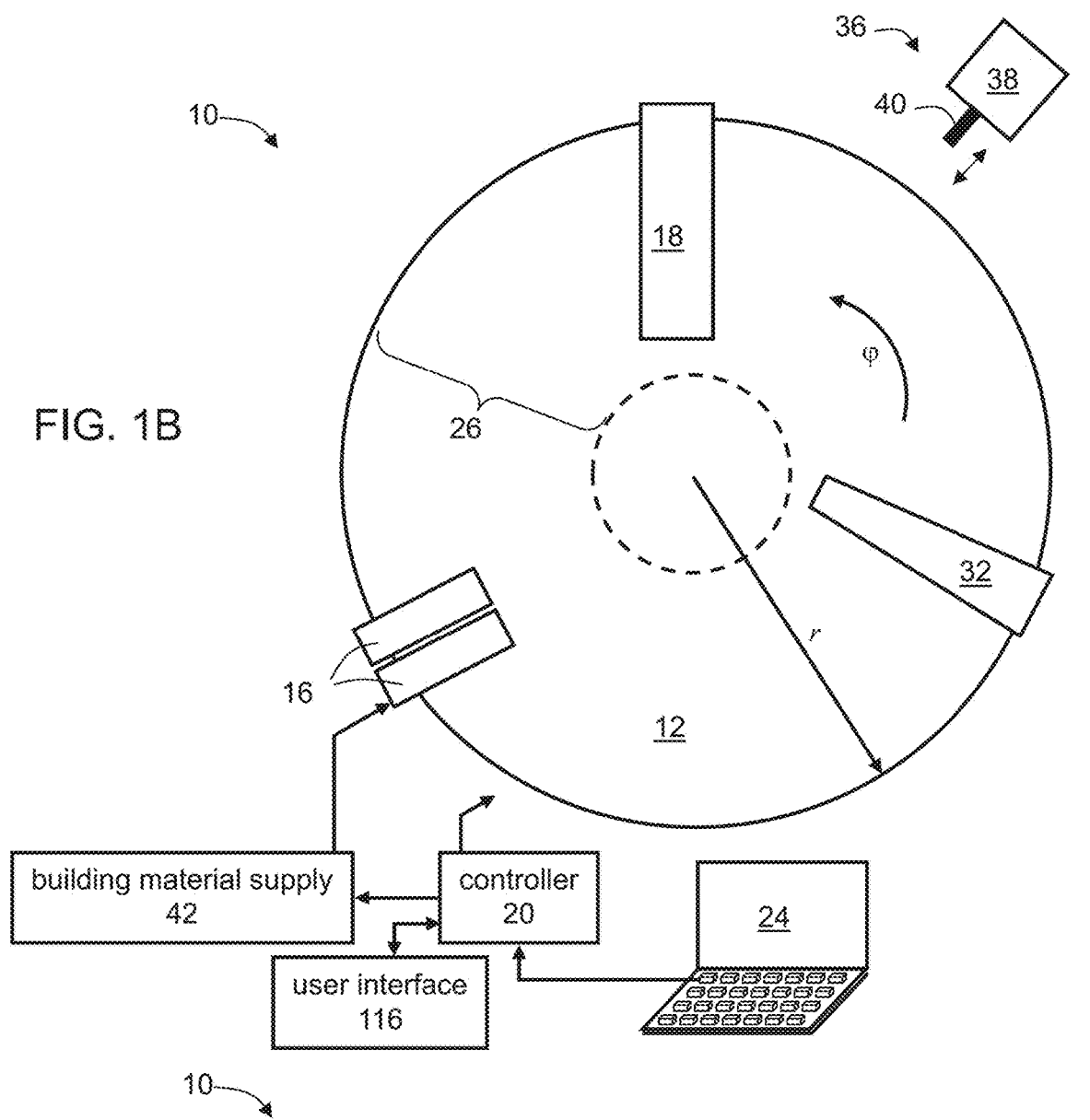
Figure 1C:
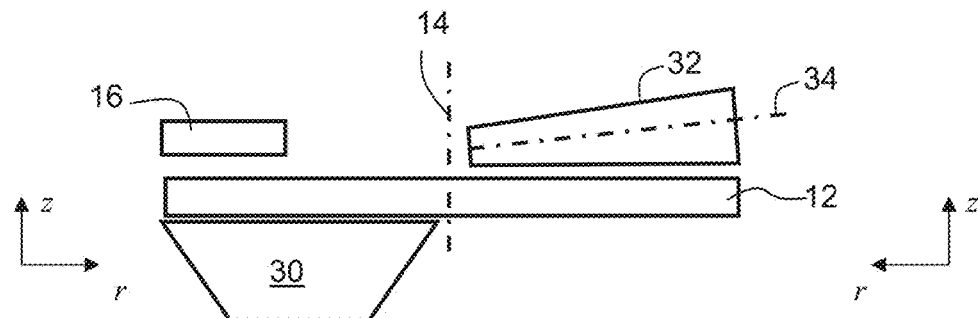
Figure 1D:
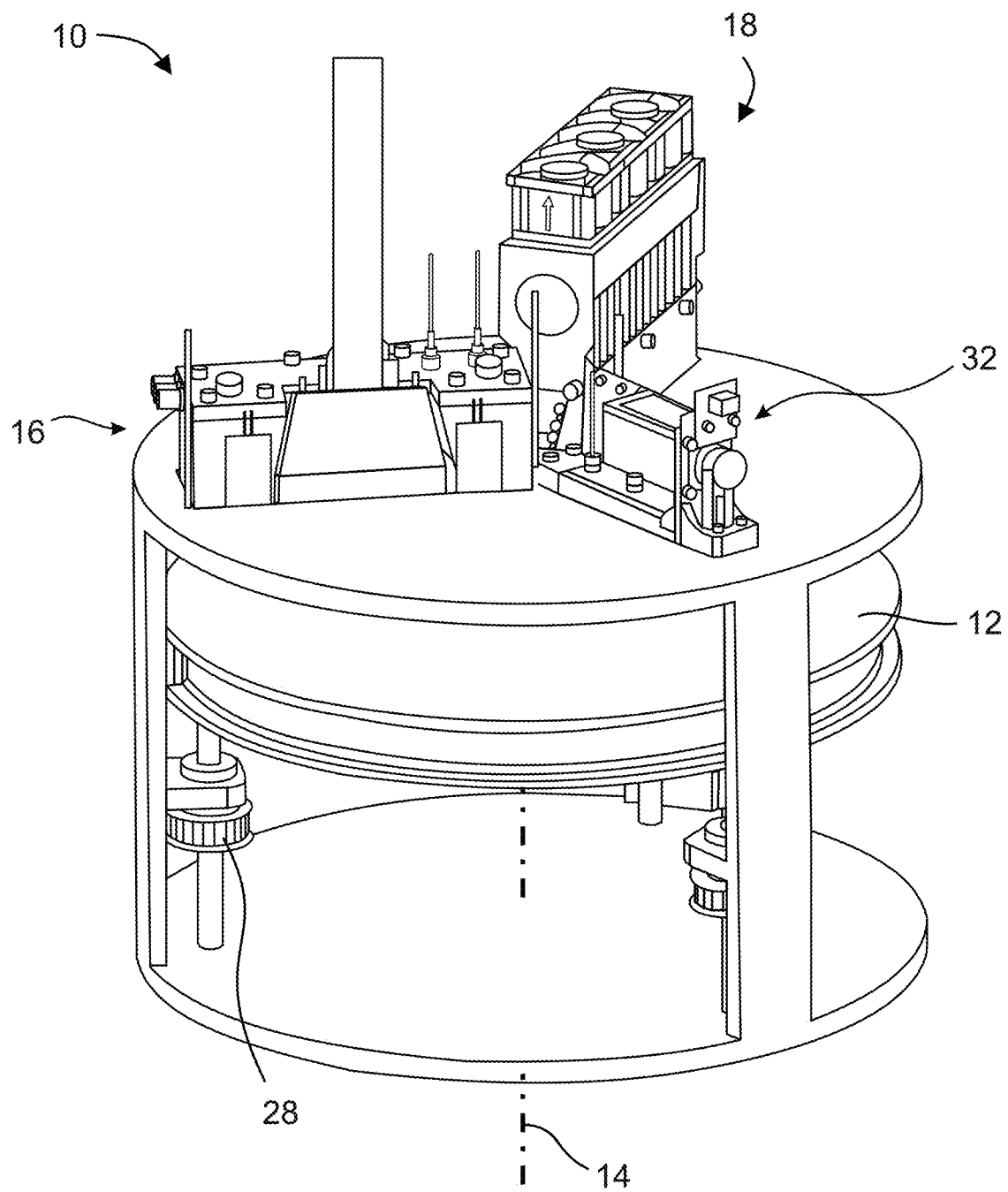

Another representative and non-limiting example of a system 10 suitable for AM of an object according to some embodiments of the present invention is illustrated in FIGS. 1B-1D. FIGS. 1B-1D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-2B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Any of systems 10 and 110 may optionally and preferably comprise a solidifying device 18 which can include any device configured to emit light, heat or the like that may cause the deposited material formulation to harden. For example, solidifying device 18 can comprise one or more radiation sources, which can be, for example, an ultraviolet or visible or infrared lamp, or other sources of electromagnetic radiation, or electron beam source, depending on the modeling material formulation being used. The radiation source can include any type of radiation emitting device, including, without limitation, light emitting diode (LED), digital light processing (DLP) system, resistive lamp and the like. In some embodiments of the present invention, solidifying device 18 serves for curing or solidifying the modeling material formulation.

In any of systems 10 and 110, the operation of the inkjet printing heads and optionally and preferably also of one or more other components of the system, e.g., the motion of the tray, the operation of the supply system, the activation, deactivation, applied voltage, and position along the vertical and/or horizontal direction of the leveling device and/or the solidifying device, etc. are controlled by a controller (shown at 20). The controller can have an electronic circuit and a non-volatile memory medium readable by the circuit, wherein the memory medium stores program instructions which, when read by the circuit, cause the circuit to perform control operations as further detailed below.

The controller preferably communicates with a data processor or host computer (shown at 24) which transmits digital data pertaining to fabrication instructions based on computer object data, e.g., a Computer-Aided Design (CAD) configuration represented on a computer readable medium in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for CAD.

The computer object data can be a data structure including a plurality of graphic elements (e.g., a mesh of polygons, non-uniform rational basis splines, etc.). Typically, the graphic elements are transformed to a grid of voxels defining the shape of the object, typically including the outer surface(s) as well as the interior of the object. For example, the graphic elements are transformed to a grid of voxels using a slicing procedure that form a plurality of slices, each comprising a plurality of voxels describing a layer of the 3D object.

Since the grid of voxels and the plurality of graphic elements describe the same object, the term "computer object data" is used herein both in relation to the grid of voxels and in relation to the plurality of graphic elements. Thus, when the computer object data relate to the grid of voxels, each element of the computer object data is a voxel, and when the computer object data relate to the graphic elements each element of the computer object data is a graphic element, e.g., a polygon, a spline, etc.

Typically, the controller controls the voltage applied to each dispensing head or nozzle array and the temperature of the building material formulation in the respective printing head. Generally, controller 20 controls printing heads to dispense, droplets of building material formulation in layers, such as to print a three-dimensional object. In system 10, controller 20 optionally and preferably controls the printing heads to dispense the droplets while the tray is rotating.

In some embodiments, the controller receives additional input from the operator, e.g., using data processor 24 or using a user interface 116 communicating with the controller. User interface 116 can be of any type known in the art, such as, but not limited to, a keyboard, a touch screen and the like. For example, controller 20 can receive, as additional input, one or more building material formulation types and/or attributes, such as, but not limited to, color, characteristic distortion and/or transition temperature, viscosity, electrical property, magnetic property. Other attributes and groups of attributes are also contemplated.

The object data formats are typically structured according to a Cartesian system of coordinates. In these cases, when system 10 is employed, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
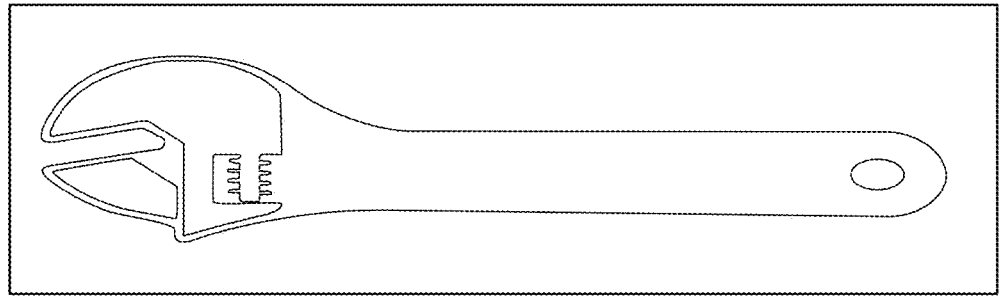
FIGS. 3A and 3B are schematic illustrations demonstrating coordinate transformations according to some embodiments of the present invention.
Figure 3B:
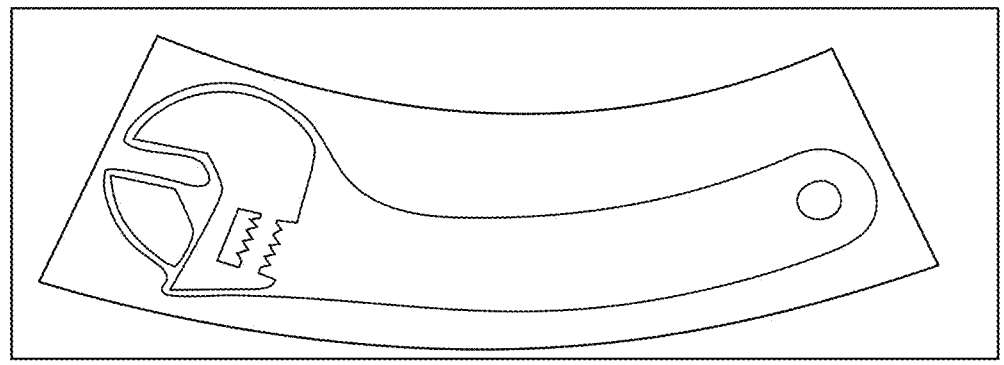

The transformation of coordinates allows three-dimensional printing over a rotating tray. In system 10, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-3B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application Nos. 20100191360 and 20170173886, the contents of which are hereby incorporated by reference.

Figure 4:
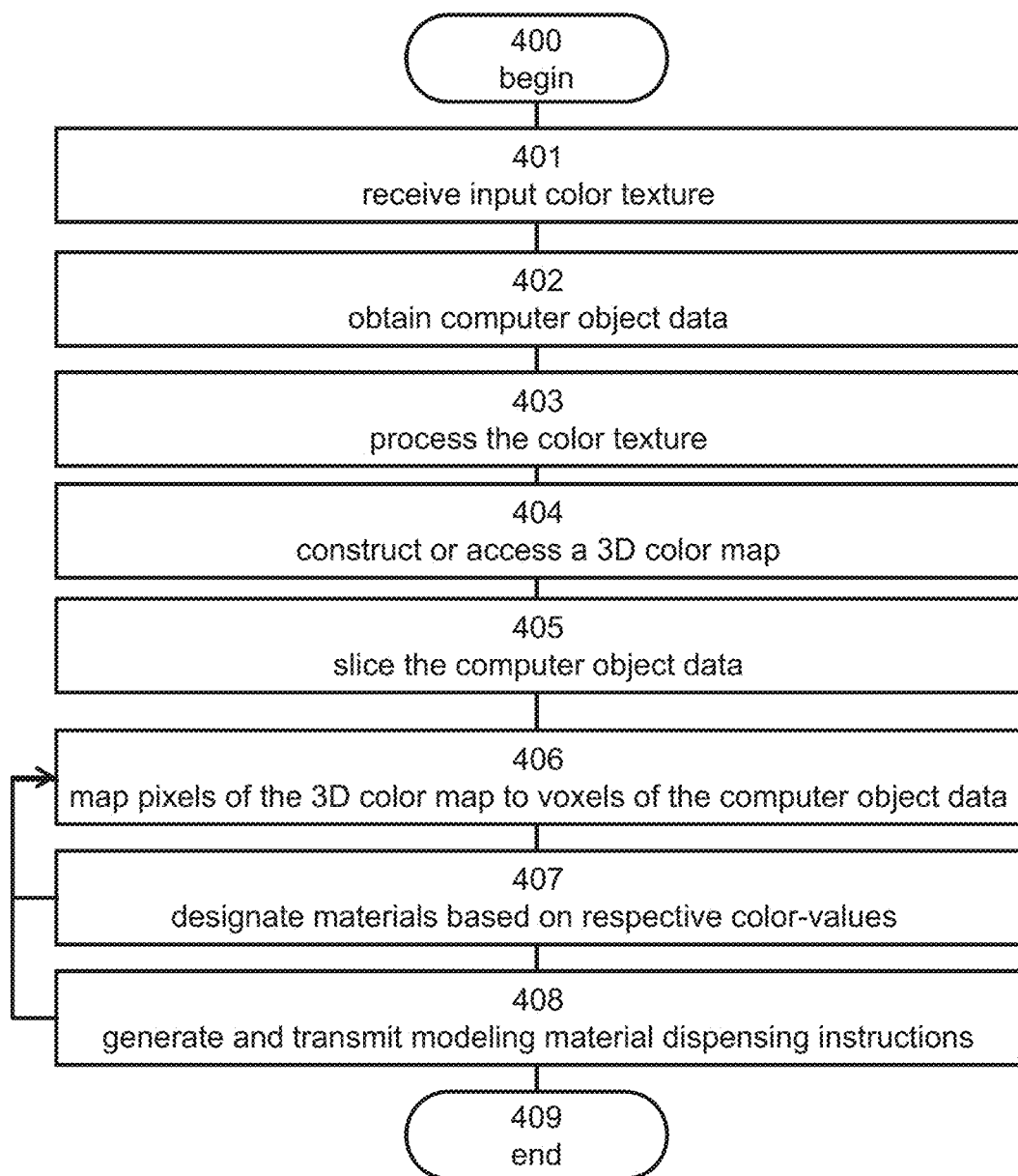
FIG. 4 is a flowchart diagram of a method suitable for processing computer object data for additive manufacturing of a three-dimensional object, according to various exemplary embodiments of the present invention.

FIG. 4 is a flowchart diagram of a method suitable for processing computer object data for additive manufacturing of a three-dimensional object, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Computer programs implementing the method can commonly be distributed to users on a distribution medium such as, but not limited to, a flash memory, CD-ROM, or a remote medium communicating with a local computer over the internet. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method. All these operations are well-known to those skilled in the art of computer systems.

The method can be embodied in many forms. For example, it can be embodied on a tangible medium such as a computer for performing the method steps. It can be embodied on a computer readable medium, comprising computer readable instructions for carrying out the method steps. In can also be embodied in an electronic device having digital computer capabilities arranged to run the computer program on the tangible medium or execute the instruction on a computer readable medium.

The method of the present embodiments can be executed by a data processor operating an AM system (e.g., data processor 24). The computer object data processed by the method can be transmitted to the controller of the AM system (e.g., controller 20). The processed computer object data can be transmitted in its entirety before the AM process begins, or in batches (e.g., slice by slice) wherein the AM process begins after the first batch arrives but before receiving the last batch. The method of the present embodiments can alternatively be executed by the controller of the AM system (e.g., controller 20). In these embodiments, the controller receives input data (such as, but not limited to, three-dimensional modeling data and an input color texture as further detailed hereinbelow) and execute the method using these input data. The input data can be received by the controller before the AM process begins, or in batches, wherein the AM process begins after the first batch arrives but before receiving the last batch.

Referring to FIG. 4, the method begins at 400 and optionally and preferably continues to 401 at which an input color texture is received. The input color texture is typically provided in the form of a map (an input color texture map) defined over a plurality of pixels and reflects the desired color perception of the object to be fabricated. In some embodiments of the present invention the input color texture map is in the form of a UV color texture map, where "U" and "V" denote the axes of the texture map, that parameterize the 3D coordinates (e.g., XYZ Cartesian coordinates, or $r\phi z$ cylindrical coordinate) of the three-dimensional object to be fabricated.

Each pixel of a subset of pixels of the input color texture contains an input color and is associated with at least one graphic element of the computer object data that define the outer surface of the object to be fabricated. Pixels of the input color texture that do not belong to this subset are optionally and preferably not in use.

The color information can be stored in more than one way. In some embodiments, the UV coordinates are stored in a computer object data file (for example, a VRML file or the like), and the color pixels are stored in an image file. In other embodiments, the color information is stored in the computer object data file, according to a coloring rule, such as, but not limited to, color per vertex, color per face, color per shape, color per shell, and color per object or part thereof. For example, when the computer object data are in the form of a mesh of polygons, each pixel of the subset of pixels of the input color texture is associated with at least one polygon on the outer surface of the object.

The input color stored in each pixel of the input color texture is optionally and preferably provided as a multibit color word having a plurality of bits (e.g., 4 bits or 8 bits or 16 bits or more) for each color component. As a representative example, the input color can comprise a multibit color word for each of the following color components: Cyan (C), Magenta (M), Yellow (Y), Black (K) and White (W). When a particular color component is described by an N-bit color word, the particular color component can have one of $2^N$ predetermined and different levels.

The input color texture typically has no depth since it only includes surface color information. In some embodiments of the present invention the input color texture is planar. Also contemplated are embodiments in which the input color texture conforms with the shape of the outer surface of the object. In these embodiments the input color texture is non-planar in the sense that it contains curvature information (although some portions of it can be planar, e.g., when a portion of the outer surface of the object is planar). In the case of color per vertex, for example, the color can be specified per each vertex of each polygon in the computer object data file, and so it conforms with the geometry of the object to be manufactured.

Color may read in any of several color spaces. Some color spaces are device dependent, and some are device independent. An example of a device independent color space is Lab* described hereinbelow. When the color space is not that of the printing apparatus, a color transformation is preferably applied, for example using the International Color Consortium model.

Conversion of color from an input representation to actual building material concentrations may be optionally and preferably parameterized by a definition of a material which can be provided in the computer object data file, or separately, as desired. Color assignment rules suitable for some embodiments of the present invention are described below, with reference to FIG. 8. These rules may optionally and preferably be parameterized by such material definition in the computer object data file.

The input color may optionally and preferably comprise a so-called alpha channel describing a degree of opacity or transparency. This input may optionally and preferably be used to calculate an amount of a clear building material to be dispensed during the fabrication of the object. The clear building material is preferably colorless so as to separate the property of color from that of opaqueness. The alpha channel can be converted to the clear building material concentrations in the same way as for the input representation (e.g., using material definition stored in the computer object data file, or provided separately).

The method optionally and preferably continues to 402 at which computer object data are obtained, for example, from an external source. The computer object data can include a plurality of graphic elements as further detailed hereinabove. In some embodiments of the present invention the graphic elements are transformed to a grid of voxels defining the shape of the object, for example, using a slicing procedure 405 that form a plurality of slices, each comprising a plurality of voxels describing a layer of the 3D object. When the additive manufacturing apparatus operates on a slice-by-slice basis, the voxels are preferably organized in the memory according to the slice they occupy. However, this need not necessarily be the case, since the voxels can be generated and stored in other organization methods. For example, when the object to be manufactured is sufficiently small, all the voxels can be stored in the working memory irrespective of the slice they occupy.

In some embodiments of the present invention the input color texture and/or computer object data and/or grid of voxels defining the shape of the object is processed 403. For example, when the input color texture map is unregistered, the processing 403 can include registration of the pixels of the map with the graphic elements or voxels on the surface of the object.

It is to be understood that the spatial resolution of the input color texture map may or may not be the same as the spatial resolution of the input computer object data. Specifically, the spatial resolution of the input color texture map can be higher, lower or the same as the spatial resolution of the input computer object data. Further, the spatial resolution of the input color texture map may or may not be the same as the spatial resolution of the grid of voxels defining the shape of the object (once obtained by transforming the graphic elements to voxels). Specifically, the spatial resolution of the input color texture map can be higher, lower or the same as the spatial resolution of the grid of voxels. Operation 403 may in some embodiments of the present invention include a resolution adjustment procedure in which the spatial resolution of the input color texture map is adjusted to the spatial resolution of the input computer object data and/or the grid of voxels.

The method optionally and preferably continues to 404 at which a 3D color map having a plurality of pixels is constructed. Each pixel of the 3D color map is associated with a color-value. In various exemplary embodiments of the invention the color-values stored in the pixels of the 3D color map have a lower level of gradation than the colors of the input color texture (e.g., as stored in the pixels of the input color texture map). For example, the color-values stored in the pixels of the 3D color map can be single-bit color-values for each color component. As a representative example, a color-value stored in a pixel of the 3D color map can comprise a single-bit color-value for each of the following color components: Cyan (C), Magenta (M), Yellow (Y), Black (K) and White (W). When a particular color component is described by a single-bit color-value, the particular color component can have one of two predetermined and different levels, typically 1 (color exists) or 0 (color does not exist).

Aside for the color-value, each of the pixels of the 3D color map is also associated with location information. The location information can include lateral coordinates, and also a depth that is provided as an integer-value number. The 3D color map can be viewed as a stack of 2D color maps, e.g., a stack of planar 2D color maps, where each 2D color map is defined over a plurality of pixels, and where each pixel of each 2D color map is associated with a color-value as further detailed hereinabove. In this view, the same depth value is associated with all the pixels of a particular 2D color map, and different 2D color maps correspond to different depth values. It is to be understood, however, that this view of the 3D color map is for illustrative purpose, and that it is not necessary to construct the 3D color map as a stack of 2D color maps, albeit such a construction is contemplated.

As will be described below, there is a mapping, optionally and preferably an injective mapping, of each pixel of the 3D color map to a voxel of the computer object data. A pixel of the 3D color map that can be mapped to a particular voxel of the computer object data is said to be "an image" of the particular computer object voxel within in the 3D color map. However, the size in terms of the number of pixels of the 3D color map is typically (but not necessarily) smaller than the size in terms of the number of voxels of the computer object data, and so the mapping is not necessarily bijective. In other words, while each pixel of the 3D color map can be mapped to a voxel in the computer object data, there is typically at least one voxel in the computer object data that no pixel can be mapped to (and therefor has no image in the 3D color map).

In some embodiments of the present invention outer layers of a core of the object are white, so that the mapped object voxels form a layer of color over a white background. Alternatively, the core can be made transparent to produce a colored transparent object. Also contemplated are situations in which there are no unmapped object voxels. These situations include a case in which the object does not include a predefined core and no background color is defined. An example of such a situation is the case in which the object is too thin to contain a core. In this case the object typically appears transparent.

It is to be understood that the spatial resolution of the 3D color map may or may not be the same as the spatial resolution of the grid of voxels defining the shape of the object. Specifically, the spatial resolution of the 3D color map can be higher, lower or the same as the spatial resolution of the grid of voxels. When the spatial resolution of the 3D color is higher than the spatial resolution of the grid of voxels, there can be more than one 3D color map pixel that is mapped to a voxel of the grid. In this case, a resolution adjustment procedure is employed to associate one of those pixels to the respective voxel. For example, the resolution adjustment procedure can include selecting the pixel that has the highest overlap with the respective voxel, and associating only the selected pixel with the respective voxel. When the spatial resolution of the 3D color is lower than the spatial resolution of the grid of voxels, there can be a 3D color map pixel that is mapped to more than one voxel of the grid. In this case, no resolution adjustment procedure is required since there is no ambiguity regarding the identity of the 3D color map pixel that is associated with the respective voxel of the grid. Yet, if desired, a resolution adjustment procedure may be employed also for this case (e.g., by increasing the resolution of the 3D color map, or reducing the resolution of the computer object data). When the spatial resolution of the 3D color is the same as the spatial resolution of the grid of voxels there is a one-to-one mapping between each 3D color map pixel and a respective voxel of the grid, and so no resolution adjustment procedure is required.

Herein, a pixel of the 3D color map that is to be mapped to a surface voxel of the computer object data (namely a voxel that belongs to a group of voxels defining one or more outer surfaces of the object) is referred to as a "topmost pixel", and a pixel that is to be mapped to an internal voxel of the computer object data (namely, a voxel that belongs to a group of voxels that are not surface voxels and that define an interior of the object) is referred to herein as "an internal pixel." In the illustrative description in which the 3D color map is viewed as a stack of 2D color maps, one 2D color map includes only, and all of, the topmost pixels, and all other maps include the internal pixels.

A more detailed description of a technique suitable for constructing the 3D color map is provided herein after. Once constructed, the 3D color map is stored in a computer readable medium, preferably a non-transitory computer readable medium, for further use by the method as described herein. In some embodiments of the present invention, the 3D color map is prepared separately and not by the method. In these embodiments, a computer readable medium storing the 3D color map is accessed without actually constructing the 3D color map.

At 405 the computer object data are sliced to form a plurality of slices, each describing a layer of the 3D object. Following the slicing 405 each of at least a portion of the voxels in each slice is optionally and preferably associated with location information. The location information can comprise lateral coordinates, and also a depth of the respective internal voxel, wherein the depth is optionally and preferably measured from the nearest surface of the object (e.g., perpendicularly to the nearest surface). Typically, the depth is provided as an integer-value number describing the depth in voxel units. Slicing 405 can be done by any technique known in the art. For example, commercially available software known as "GrabCAD Print" can receive CAD data, provide a plurality of slices, and can also associate the location information of the present embodiments. Also contemplated is a technique disclosed in International Publication No. WO2017147412, of the same Assignee as the instant application and being hereby incorporated by reference in its entirety. In this technique, a voxel from a 3D build space is selected and a distance field value relative to a 3D object in the 3D build space is determined. The distance field value can then be used to determine the depth value to be assigned to each voxel.

Alternatively, the method can receive sliced computer object data from an external source, e.g., a computer readable medium, in which it is not necessary to execute operation 405.

At 406 pixels of the 3D color map are mapped to voxels of the computer object data. This is optionally and preferably done based on the location information associated with each pixel of the 3D color map and with each voxel of the computer object data. Specifically, a pixel is mapped to a voxel when the lateral coordinates and depth of the pixel respectively match lateral coordinates and depth of the voxel. When the spatial resolution of the 3D color map is not the same as the spatial resolution of the computer object data, a resolution adjustment procedure can be employed as further detailed hereinabove.

The method optionally and preferably proceeds to 407 at which materials to be used during the additive manufacturing are designated for the voxels to which pixels of the 3D color map were mapped at 406. The designation is optionally and preferably for modeling materials. The designation is based on the respective color-values of the mapped pixels. For example, when the color-values of the 3D color map are single-bit color-values, each color-value bit can serve as a type of material, e.g., when the color-value is "1" for cyan and "0" for all other colors then a material whose color is cyan is designated to the respective voxel. In cases in which the mapping between the 3D color map and the computer object data is subjective but not bijective, all voxels in the computer object data that do not have an image in the 3D color map, are designated with the same material, which is preferably predetermined (e.g., a material whose color is white).

In some embodiments of the present invention the 3D color map already includes material designation associated with each of its pixels. In these embodiments, operation 407 can be executed by pulling the material designation from the respective pixel of the 3D color map.

In some embodiments of the present invention the method continues to 408 at which dispensing instructions readable by a controller of additive manufacturing system are generated. The instructions typically include instructions to dispense voxels of the designated modeling materials to form layers that are described by the slices, and, for at least some of the slices, to also dispense voxels of support material at locations that are outside the final 3D object and at which support material is required (e.g., to form a support structure or to otherwise protect the modeling materials during manufacturing). The dispensing instructions can then be transmitted to the controller (e.g., controller 20).

Optionally and preferably, at least one of operations 406, 407 and 408, more preferably each of operations 406, 407 and 408, is executed separately for each slice. Preferably, once 407 or 408 is executed for a particular slice, the method loops back from 407 or 408, to 406 to execute 406, 407 and 408 for the next slice. The advantage of this embodiment is that is saves on memory and computing resources, since only a relatively small portion of the computer object data is processed at a time.

The method ends at 409.

A more detailed description of selected operations of the method will now be provided. An object may be fabricated by AM using a modeling material which typically has some transparency. The assignment of color-values to the internal and surface voxels thus affects the color perception by subtractive color mixing of all colors within a depth into the surface. The perceived color of each surface voxel is therefore defined in terms of the subtractive color mixing of a certain number of voxels extending into the depth of the object.

Figure 5:
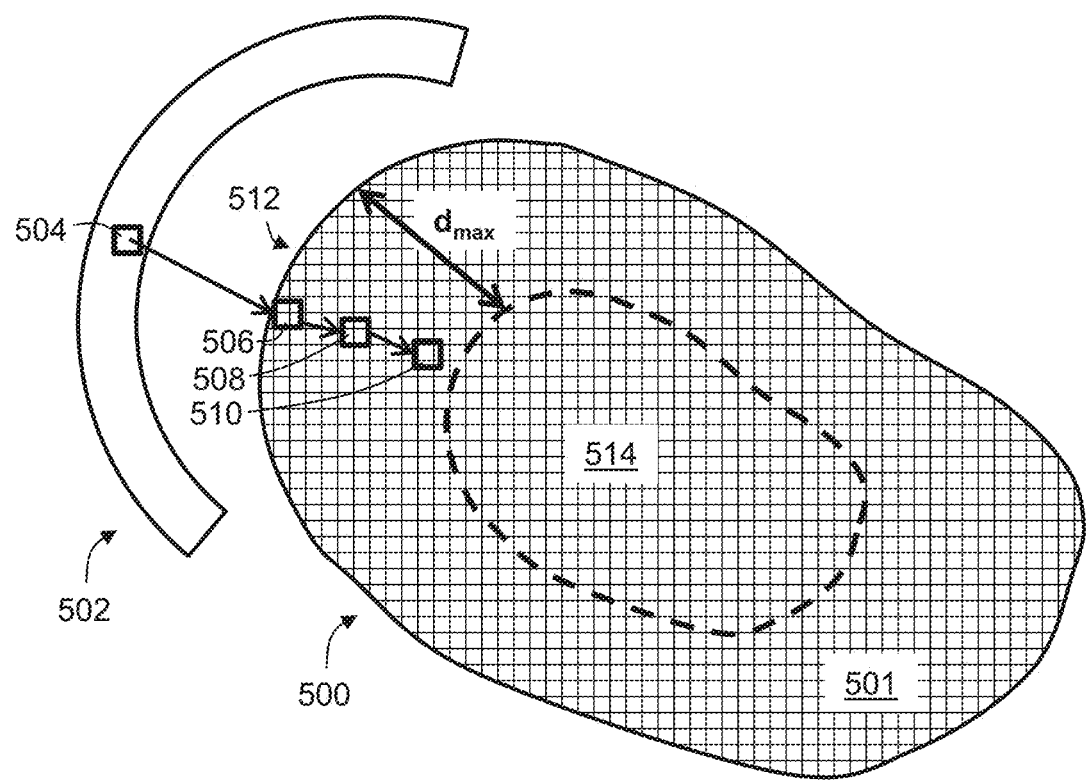
FIG. 5 is a schematic illustration of a slice of computer object data and a portion of an input color texture, according to some embodiments of the present invention.

Preferably, the color-values of the 3D color map of the present embodiments are selected so as to diffuse color errors inwardly into the depth of the object. Such color error diffusion is schematically illustrated in FIG. 5. Shown is a slice 500 of computer object data (corresponding to a layer of a three-dimensional object manufactured by AM). The voxels of slice 500 that have an image in the 3D color map (namely voxels for which pixels of the 3D color map can been mapped to) are shown at 501, and voxels of slice 500 that do not have an image in the 3D color map (namely those voxels for which no pixel has been mapped to) are shown at 514. While the voxels shown in FIG. 5 are data entities, they correspond to physical voxels since the voxels of the computer object data are used by the AM system to form physical voxels made of building materials as described above. Therefore, in the description below, the voxels shown in FIG. 5 will also be referred to as physical voxels.

The input color stored in pixel 504 is the desired color to be perceived by a viewer looking at a particular physical voxel on the surface of the object, once the object is manufactured. The voxel of the computer object data surface that corresponds to this physical voxel is denoted 506.

Also shown is a portion of an input color texture 502. The input color texture 502 is defined over a plurality of pixels and reflects the desired color perception of the object to be fabricated. Each pixel of the input color texture 502 includes an input color and is associated with a corresponding geometric element of the computer object data that is on the surface of the object. The computer object data in FIG. 5 are shown following the transformation of the geometric elements to voxels, so that each pixel of the input color texture 502 is shown as being associated with a corresponding surface voxel on the surface of the object. When the spatial resolution of input color texture 502 is not the same as the spatial resolution of the computer object data, a resolution adjustment procedure can be employed as further detailed hereinabove.

For clarity of presentation, the input color texture 502 is shown separated from the slice 500. In practice, the color-value of the pixel that is mapped to a particular surface voxel at 406 is not the same as the desired color perception of that particular surface voxel according to input color texture 502, particularly when the color-values of the pixel has a lower level of gradation than the input color provided by the input color texture 502.

A representative example of the situation is illustrated in a path beginning at a pixel 504 of input color texture map 502. Picture-elements (pixels, voxels) along the path are enlarged for clarity. The input color stored in pixel 504 is the desired color to be perceived by a viewer looking at a particular physical voxel on the surface of the object, once the object is manufactured. The computer object data surface voxel that corresponds to this physical voxel is denoted 506. Aside for pixel 504 and surface voxel 506, the path shows additional (two, in this non-limiting example) internal voxels 508, 510 at different depths from the periphery 512 of slice 500 (representing an outer surface of the object once fabricated). For each of internal voxels 508, 510, the surface voxel 506 is the closest among all other surface voxels of slice 500.

Suppose that pixel 504 stores a desired input color denoted by $C_0$, which may be expressed as a multibit word for each color component. Suppose further that the color-value of the pixel that is mapped at 406 (see FIG. 4) to surface voxel 506 is $C_1$, the color-value of the pixel that is mapped at 406 to surface voxel 508 is $C_2$, and the color-value of the pixel that is mapped at 406 to surface voxel 510 is $C_3$. Each of colors $C_1$, $C_2$, $C_3$ can include a single-bit color-value for each color component. Typically, none of color-values $C_1$, $C_2$, $C_3$ is the same as the input color $C_0$, and so a color error at surface voxel 506 diffuses inwardly into the internal voxels 508 and 510.

The diffusion optionally and preferably propagates until a depth of $d_{max}$ is reached, $d_{max}$ being a depth parameter that characterizes the maximal depth of the 3D color map at the location of pixel that is mapped to surface voxel 506. Internal voxels at depths beyond the depth $d_{max}$ do not have an image in the 3D color map, and can be assigned with the same color-value, irrespectively of $C_0$, for example, a single-bit color-value that corresponds for example to white voxels. Preferably all voxels at or near (e.g., within 5 voxels from) the depth $d_{max}$ are assigned with a single-bit color-value that corresponds to white voxels. A typical value for the depth parameter $d_{max}$ is from about 0.1 mm to about 2 mm, or from about 0.5 mm to about 1 mm.

The path 506-508-510 shown in FIG. 5 can be one of many possible paths that begin with surface voxel 506 (and that therefore correspond to the same pixel 504 of input color texture 502). These paths are not shown for clarity of presentation, but one of ordinary skills in the art, provided with the details described herein would know how to adjust FIG. 5 to show more than one path. Method 400 is optionally and preferably executed such that the assignment of color-values as described above is repeated for each of at least a portion of these paths, and more preferably for all these paths.

The color-values of the pixels of the 3D color map are preferably selected such that the subtractive color mixing among all voxels viewable inwardly from the respective surface voxel, including the surface voxel itself (the subtractive color mixing among $C_1$, $C_2$, $C_3$ in the above example) reconstructs the input color of the respective pixel of input color texture 502 (pixel 504 in the above example), with a small color difference between the desired color and the subtractive color mixing.

Color difference is conveniently expressed herein by quantities which can be calculated using mathematical operations in the CIE (L*, a*, b*) color space. When the color profile of the beam is expressed in terms of other color spaces (e.g., RGB, CMYK or CIE XYZ) the color difference can be expressed in those color spaces, or, alternatively, the respective color space can be transformed to the CIE (L*, a*, b*) color space to allow the calculation of the color difference in this space. Such type of color transformations are well known to those having ordinary skill in the art of optics. For example, transformation of X, Y and Z tristimulus values to L*, a* and b* coordinates can be done using a preselected white-point $(X_W, Y_W, Z_W)$ which, in some embodiments of the present invention, can be approximated as $(X_W, Y_W, Z_W) = (0.9642, 1.0000, 0.8251)$.

The CIE (L*, a*, b*) color space is commonly referred to as a "uniform" color space in that steps of equal size from one color point to another in the color space are perceived approximately as equal differences in color. Every color is treated as a point in the color space and represented by the triplet (L*, a*, b*). The difference between two colors can be quantified using the Euclidian distance between the corresponding points in the color space. Formally, denoting the coordinates of two colors by $(L_1^*, a_{1*}, b_2^*)$ and $(L_2^*, a_{2*}, b_3^*)$, the difference between the two colors is given by:

$$\Delta E^* = \sqrt{(L_1^* - L_2^*)^2 + (a_1^* - a_2^*)^2 + (b_1^* - b_2^*)^2}$$

Using the above equation, the color difference between any two colors can be expressed in terms of the so called "$\Delta E^*$ unit." Thus, for example, the color difference between two colors is said to be 1 $\Delta E^*$ unit if the right-hand side of the above equation as calculated for the two colors is unity.

In some embodiments of the present invention the color difference between the subtractive color mixing and the desired color provided by the input color is less than 10 $\Delta E^*$ units or less than 5 $\Delta E^*$ units or less than 2 $\Delta E^*$ units.

Figure 6:
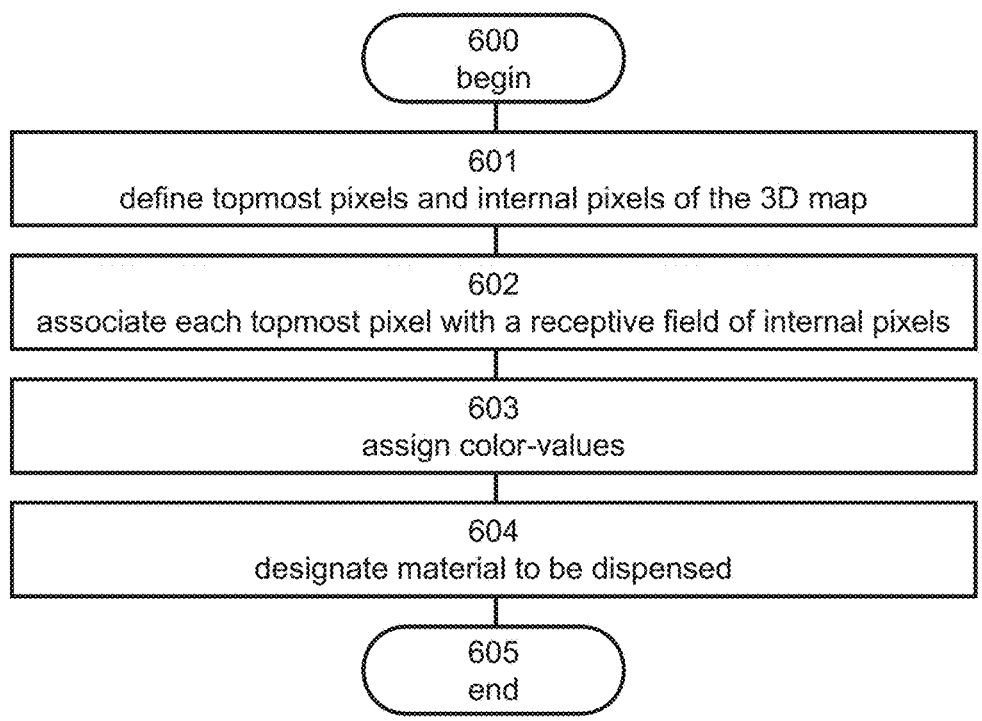
FIG. 6 is a flowchart diagram describing a procedure suitable for constructing the 3D color map, according to some embodiments of the present invention.

FIG. 6 is a flowchart diagram describing a procedure suitable for constructing the 3D color map, according to some embodiments of the present invention.

The procedure begins at 600 and optionally and preferably continues to 601 at which a plurality of pixels of the map are defined. The pixels are defined as data entities (e.g., elements of an array) that can store or be associated with color-values, location information, and a set of pointers as further explained below. Each of the defined pixels is categorized as either a topmost pixel or an internal pixel. The topmost pixels are preferably registered with the input color texture, so that each pixel corresponds to one of the pixels of the input color texture. Such registration is useful for assigning color-values to the pixels of the 3D color map as further detailed below.

The pixels can be defined such that the 3D color map has a uniform or non-uniform depth thereacross. Uniform depth is preferred from the standpoint of computation simplicity and non-uniform depth is preferred from the standpoint of saving on memory usage. When the 3D color map has a uniform depth, the aforementioned depth parameter $d_{max}$ has a global value that is the same for each pixel over the map, and when the 3D color map has a non-uniform depth, the aforementioned depth parameter $d_{max}$ has a local value that varies as a function of a lateral coordinate over the map. In the latter case, $d_{max}$ has different values when measured at two or more different topmost pixels. In various exemplary embodiments of the invention the value of $d_{max}$ is equivalent to an object depth of at most 1 mm.

When the 3D color map has a non-uniform depth, the local value of $d_{max}$ can be selected based on a curvature of the surface of the object.

In some embodiments of the present invention the value of $d_{max}$ is lower for convex regions of the surface than for concave regions of the surface. These embodiments are particularly useful when the colored materials (e.g., cyan, magenta, yellow) are more transparent than the black and white material. It was found by the inventors that making the 3D color map thinner at convex regions reduces or eliminates excess translucence.

In some embodiments, the materials that are used for dispensing to form the convex regions are selected to ensure that the outer surface of the object to be fabricated is more opaque in the convex regions than in the concave or planar regions, as further detailed hereinbelow. In these embodiments the value of $d_{max}$ is preferably higher for the convex regions than for the concave or planar regions.

Also contemplated are embodiments in which the local value of $d_{max}$ is selected based on the input color texture. For example, suppose that a pixel p1 of the input color texture is more opaque than another pixel p2 of the input color texture. In this case, the local value of $d_{max}$ at the topmost pixel of the 3D map that is registered with p2 is higher than the local value of $d_{max}$ at the topmost pixel of the 3D map that is registered with p1. This ensures that higher depth is selected for lesser local opacity, and has the advantages of saving on memory resources in regions at which there is no need for high depths, and providing high accuracy of color perception is regions at which the opacity is sufficiently low to allow color mixing among a larger number of pixels.

The procedure can continue to 602 at which each topmost pixel is associated with a group of internal pixels forming a receptive field for the topmost pixel. This process will now be explained with reference to FIG. 7.

Figure 7:
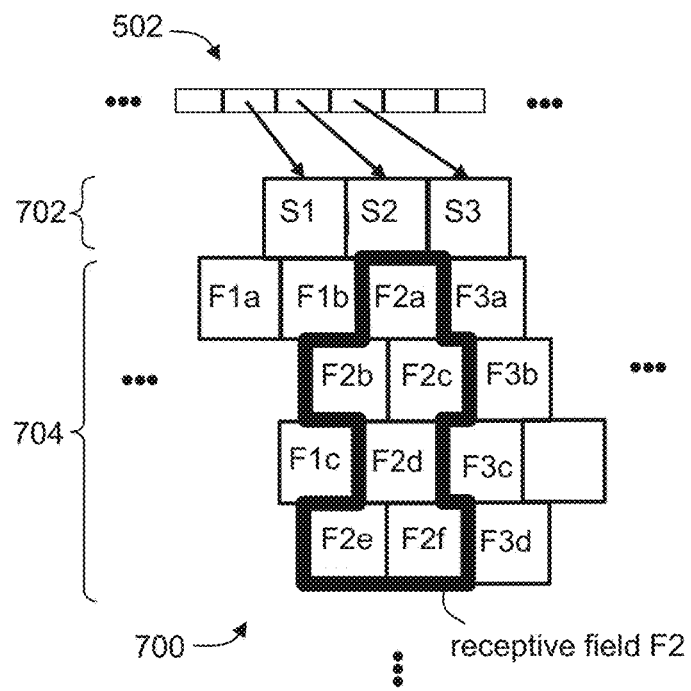
FIG. 7 is a schematic illustration of a portion of a three-dimensional color map with a plurality of topmost pixels and a plurality of internal pixels, according to some embodiments of the present invention.

Shown in FIG. 7 is a portion of a three-dimensional color map 700 with a plurality of topmost pixels 702 and a plurality of internal pixels 704. The sets of three black dots in FIG. 7 imply that the 3D color map may include more pixels to the right, left and below the shown pixels. In the representation in which the 3D color map 700 is as a stack of 2D color maps, pixels 702 form the topmost 2D map of the stack, and pixels 704 form all the other 2D maps of the stack (each 2D map corresponds to a different depth).

The topmost pixels are enumerated $S_1$, $S_2$, $S_3$, etc. Also shown in FIG. 7 is a portion of input color texture 502. The registration between the pixels of input color texture 502, and topmost pixels 702 (pixels S1, S2 and S3 in the present example) is illustrated as arrows. It is to be appreciated that the number of topmost pixels is typically greater than three and that the registration is preferably such that each pixel of input color texture 502 corresponds to a different pixel among topmost pixels 702. When the spatial resolution of input color texture 502 is not the same as the spatial resolution of the 3D color map, a resolution adjustment procedure can be employed as further detailed hereinabove.

A group of internal pixels are highlighted within a thicker line. The pixels in this group are enumerated F2a, F2b, etc. This group of internal pixels forms a receptive field associated with topmost pixel S2. This receptive field is denoted F2, to indicate that it is a field that is associated with topmost pixel S2. Similarly, topmost pixel S1 is associated with a group of pixels F1a, F1b, F1c, etc., forming a receptive field F1 for pixel S1, and topmost pixel S3 is associated with a group of pixels F3a, F3b, F3c, etc., forming a receptive field F3 for pixel S3, and so on.

Typically, a particular internal pixel is defined to be in the receptive field of the topmost pixel that is closest to the particular internal pixel among all the other topmost pixels. Thus, for example, internal pixel F2a belongs to field F2 since S2 is the closest topmost pixel to F2a, and internal pixel F2b also belongs to field F2 since S2 is the closest topmost pixel to F2b. However, F1b and F1c do not belong to F2, since S1 is closer than S2 to these internal pixels. Similar considerations apply mutatis mutandis to each of the internal pixels of map 700.

In some cases, the location of a particular internal pixel is such that the same pixel can be suited for inclusion in two or more different receptive fields. Such situation occurs when the criterion for determining in which receptive field to include the internal pixel does not provide a unique result. An example of such situation is a case in which two or more topmost pixels are at the same distance from the particular internal pixel, wherein all other topmost pixels are at larger distance from the particular internal pixel, so that there is no unique topmost pixel that is the closest to the particular internal pixel. In such cases the procedure optionally and preferably selects one of the candidate receptive fields and includes the internal voxel in question in the selected field. The selection can be according to a predetermined statistical distribution, such as, but not limited to, a uniform statistical distribution.

The information pertaining to the receptive field of each topmost pixel is optionally and preferably stored in association with the respective topmost pixel as a set of pointers (e.g., memory addresses, or indices to a table of pixels) that identify the pixels that belong to the receptive field of that topmost pixel. For example, a set of pointers that identify pixels F2a, F2b, etc. is stored in association with topmost pixel S2, and so on.

Returning to FIG. 6, the procedure continues to 603 at which color-values are assigned to the pixels of the 3D color map. Preferably the color-values that are assigned to the pixels are single-bit color-values for each color component as further detailed hereinabove. For each topmost pixel and each internal pixel of the receptive field that is associated with this topmost pixel, the assignment of color-value is optionally and preferably based on the color texture and on a subtractive color mixing of the topmost pixel with its receptive field. Preferably, the color-value is selected such that subtractive color mixing reproduces a respective portion of input color texture (e.g., the pixel of the input color texture that is registered with the respective topmost pixel) within less than 10 ΔE* units.

For example, suppose that in FIG. 7 the pixel of color texture 502 that is registered with topmost pixel S2 has an input color $C_0$, which may be expressed as a multibit word for each color component. In this case the color-values assigned to topmost pixel S2 and to each internal pixel in field F2 are selected such that the subtractive color mixing of the color-value assigned to S2 with the color-values assigned to F2a, F2b, . . . etc. and these assigned color-values reproduces color $C_0$ within less than 10 ΔE* units. Typically, none of the color-values that are assigned to topmost pixel S2 and to the internal pixels in field F2 is the same as $C_0$.

In some embodiments of the present invention the color-values are assigned based on color assignment rules that are stored in a database, as will now be explained.

A computer readable medium containing a color assignment database is preferably accessed. A schematic illustration of an example color assignment database is illustrated in FIG. 8. The color assignment database includes a plurality of entries (M entries in the present example), each having a surface color, and a plurality of sets of color assignment rules. For example, the first entry of the database has a surface color referred to as "surface color 1" and $N_1$ sets of color assignment rules referred to as set 1-1 through 1-$N_1$. Preferably, but not necessarily, at least one of the color assignment rule sets, more preferably each of the color assignment rule sets comprises a set of depth-dependent color assignment rules. Specifically, the set of color assignment rules includes a first color assignment rule for the topmost pixels, a second color assignment rule for internal pixels immediately below the topmost pixels, etc. Formally, a set of color assignment rules can be represented by a string of length k $C_1 C_2 \ldots C_k$, where each of the $C_1, C_2 \ldots C_k$ represents a color-value (preferably a single-bit color-value). Typically, the length of the strings is equal to $d_{max}$.

In some embodiments of the present invention the database includes, for a particular surface color and a particular depth, different sets of color assignment rules for different geometrical characteristics of the computer object data. For example, the database can include, for a particular surface color and a particular depth, one set of color assignment rules that is suitable for use when the respective pixel of receptive field is at a corner of the object, another set of color assignment rules that is suitable for use when the respective pixel of receptive field is within a relatively thin wall of the object, and the like. Color assignment rules suitable for relatively thin walls are found, for example, in International publication No. WO2015/111059, the contents of which are hereby incorporated by reference.

The surface colors of the database are typically colors that are to be matched with the input color of the pixel of the input color texture (e.g., input color $C_0$, in the above example). To better understand the principles of the multiple sets of color assignment rules for one input color, consider the following example, which is not to be considered as limiting.

Suppose that pixel p1 of the input color texture stores a red color in it. According to a subtractive color mixing model, a red color can be obtained by a subtractive mixing scheme including 25% yellow and 75% magenta. An approximation to this scheme can be achieved by several sets of color assignment rules in which one of yellow (Y), magenta (M) or white (W) are assigned to the pixels in the receptive field that is associated with the pixel of the color map that is registered to p1. For example, a first set of assignment rules can be represented by the string MYMMY to provide an apparent color of the surface voxel equivalent to about 80% magenta and about 20% yellow; a second set of assignment rules can be represented by the string MYMYM to provide the equivalent of about 70% magenta and about 30% yellow; a third set of assignment rules can be represented by the string MMYWW to provide the equivalent of about 90% magenta and about 20% yellow; and a fourth set of assignment rules can be represented by the string MYMWW to provide the equivalent of about 60% magenta and about 30% yellow.

While each of the above set of assignment rules is represented by a five-character string (hence corresponds to a depth parameter $d_{max}$ that is equal to 5), this need not necessarily be the case, since other values for the depth parameter can be used. Furthermore, different assignment rules can be represented by strings of different lengths, and can therefore correspond to different values of the depth parameter.

The database is optionally and preferably used for each topmost pixel of the map. Thus, the procedure determines the input color of the pixel of the input color texture that is registered to the respective topmost pixel, and selects one or more sets of color assignment rules corresponding to the determined input color. Preferably, the selection is executed to ensure that at least two different sets of color assignment rules are respectively selected for at least two different internal pixels of the same field. The selection can be random or, it can be according to some ordering of selection, e.g., a cyclic ordering. In some embodiments of the present invention the selection is based on topmost pixels neighboring the respective topmost pixel. For example, when the respective topmost pixel is surrounded by topmost pixels of the same color, sets of assignment rules that are similar to the above the first or second sets of assignment rules are preferred (typically sets that do not terminate with rules to assign white color). Conversely, when the respective topmost pixel is adjacent to topmost pixels of a different color, sets of assignment rules that are similar to the above third or fourth sets of assignment rules are preferred (typically sets that terminate with one or more rules to assign white color).

In some embodiments of the present invention, once a color-value is assigned to a pixel, location information and/or receptive field information that may be stored in association with this pixel is according to an embodiment of the present embodiments removed. The advantage of this operation is that it saves memory resources during execution. For example, the pixels of the map can be processed in batches, wherein prior to the processing of the next batch of pixels, some of the memory allocated for those pixels that have already been assigned with a color-value is freed since the location and/or receptive field information is no longer required.

The above assignment procedure is particularly useful when it is desired to fabricate objects or parts of objects that are relatively transparent.

Also contemplated is the use of a function that is defined over the 3D map is optionally and preferably used for the assignment. The function can receive a depth value and material concentrations so that for each depth value and each input non-white material concentration the function outputs a non-white material concentration. This embodiment is particularly useful when it is desired to fabricate objects or parts of objects that are relatively opaque.

The function is preferably defined over the 3D map such that for small depth values and low input non-white material concentrations it outputs higher concentrations of white material, relative to the concentration of white material in larger depth values. The smaller the depth value (namely, closer to the object's outer surface), the higher is the concentration of white material. For larger depth values, and lower input non-white material concentrations, the function outputs higher concentrations of non-white material. It was found by the inventors that such a function maintains the outside appearance of the object unchanged, and increases the linearity of the fabrication process with respect to color gradation. A representative example of a function suitable for these embodiments is provided in the Examples section that follows.

Referring again to FIG. 6, the procedure optionally and preferably continues to 604 at which a material to be used for forming a voxel during additive manufacturing is designated for each pixel based on the assigned color-value. The designation 604 is optionally and preferably for modeling materials. For example, when the color-values are single-bit color-values, each color-value bit can serve as a type of material, e.g., when the color-value is "1" for cyan and "0" for all other colors then a material whose color is cyan is designated to the respective voxel. In one embodiment, operation 604 is executed when the map is constructed, or in an alternative embodiment it can be skipped, in which case the material is designated by the method that reads the color-values from the map (e.g., method 400).

When the color-values are assigned using sets of color assignment rules, the rules can also be used for designating the materials. For example, the aforementioned first set of assignment rules for red color can be realized by executing a first material deposition rule in which the surface voxel is occupied by a modeling material of the largest occurrence level the internal voxel of depth 2 (namely adjacent to the surface voxel into the depth) is occupied with a modeling material of the second largest occurrence level, each of the internal voxels at depths 3 and 4 are occupied with the modeling material of the largest occurrence level, and the internal voxel at depth 5 is occupied with the modeling material of the second largest occurrence level.

The aforementioned second set of assignment rules for red color can be realized by executing a second material deposition rule in which the surface voxel is occupied by a modeling material of the largest occurrence level, the internal voxel of depth 2 is occupied by a modeling material of second largest occurrence level, the internal voxel of depth 3 is occupied by a modeling material of largest occurrence level, the internal voxel of depth 4 is occupied by a modeling material of second largest occurrence level, and the internal voxel of depth 4 is occupied by a modeling material of largest occurrence level The aforementioned third set of assignment rules for red color can be realized by executing a third material deposition rule in which the surface voxel and the internal voxel at depth 2 occupied by a modeling material of largest occurrence level, the internal voxel at depth 3 is occupied by a modeling material of second largest occurrence level, and each of the internal voxels at depths 4 and 5 are white.

In a fourth material deposition rule, the surface voxel is occupied by a modeling material of largest occurrence level, the internal voxel at depth 2 is occupied by a modeling material of second largest occurrence level, the internal voxel at depth 3 occupied by a modeling material of largest occurrence level, and each of the internal voxels at depths 4 and 5 are white.

As stated, the materials that are used for dispensing to form convex regions of the object's surface are selected, in some embodiments of the present invention, to ensure that the outer surface of the object is more opaque in the convex regions than in the concave or planar regions. Increased opaqueness can be ensured by modifying, for a selected set of voxels, the designation of transparent materials (e.g., a colored material) to include materials that are more opaque (e.g., a black or white material). The relative amounts of white and black voxels is optionally and preferably calculated so as not to vary the color appearance by more than a predetermined color variation. For example, the relative amounts of white and black voxels can be selected such that the luminance of the resulting color, as measured by the L* component of the CIE (L*, a*, b*) color space, vary by 5 $\Delta E^*$ units or less, relative to the luminance of the color prior to this modification. The amount of white and black relative to the other colors can be selected to achieve a predetermined minimal amount of opacity. Also contemplated, are embodiments in which the relative amounts depend on the distance of the voxels from the surface and the radius of curvature, in a manner that more white and black voxels are designated at sharper edges.

Figure 10A:
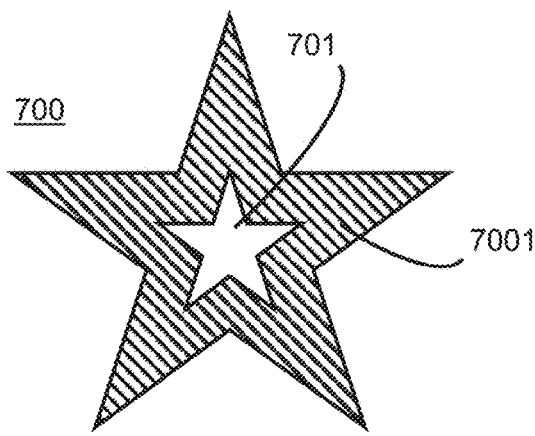
FIGS. 10A, 10B and 10C are schematic illustrations of a procedure for processing computer object data and 3D color map, particularly useful when the object comprises convex regions.
Figure 10B:
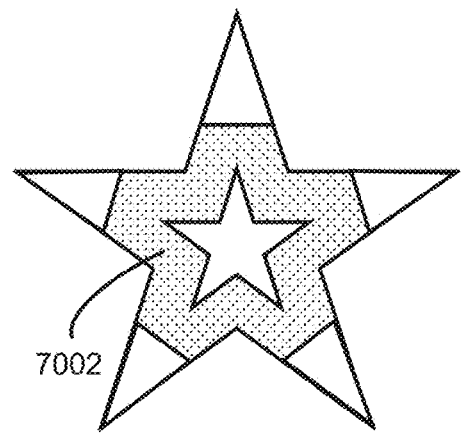
Figure 10C:
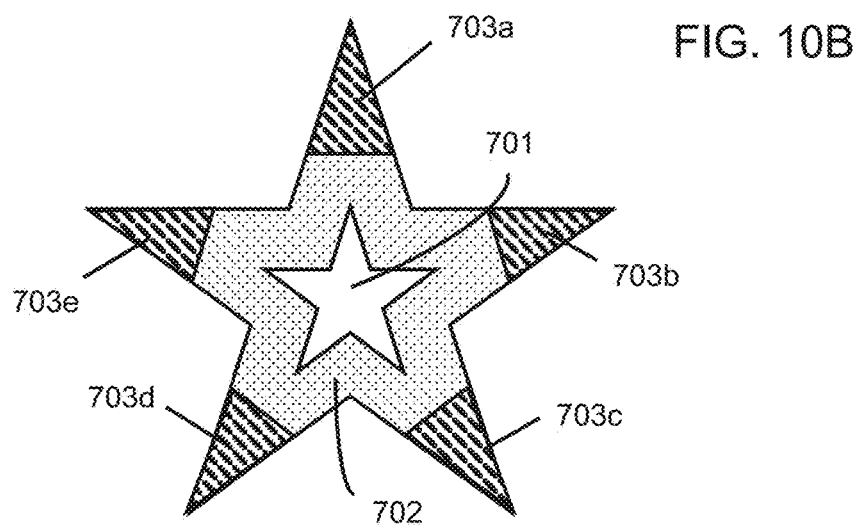

FIGS. 10A-10C illustrate a representative and non-limiting procedure which can be used to select the set of voxels for which the modification of material designation is applied. A 3D morphological operation of erosion to a predetermined depth D is applied to separate the set of voxels defining object 700 into a first outer coat 7001 and an inner core 701, where first outer coat 7001 is the region of the 3D map. An additional 3D morphological operation of dilution is applied to the core to provide a second outer coat 7002. The dilution operation can be applied to a depth that is similar or the same as the depth used for the erosion operation. The modification of material designation is then applied to the set of voxels that belong to first coat 7001, but do not belong to second coat 7002. FIG. 10C schematically illustrates the results of this procedure. The largest star represents the original shape of object 700, inner star 701 is the core region of object 700, the 3D color map rules are applied to region 702, and regions 703a-703e are the regions in which some or all transparent colored materials are replaced with more opaque black and/or white materials (e.g., 20-80% opacity) to increase opaqueness.

The procedure ends at 605.

Figure 9:
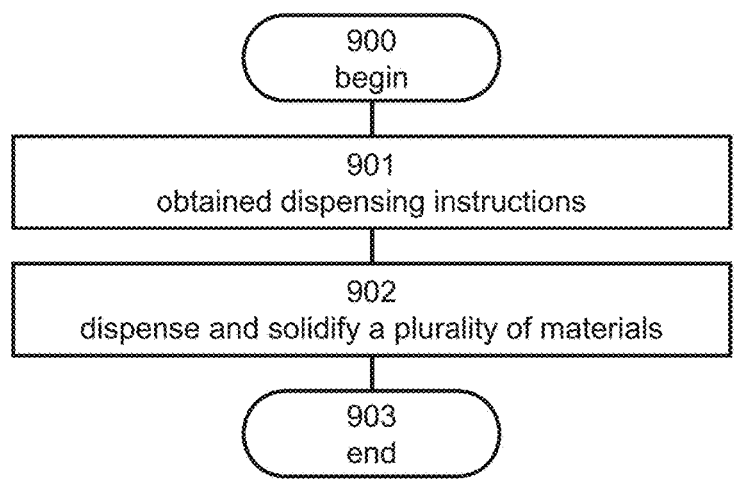
FIG. 9 is a flowchart diagram describing a method of additive manufacturing an object, according to some embodiments of the present invention.

FIG. 9 is a flowchart diagram describing a method of additive manufacturing an object, according to some embodiments of the present invention. One or more of the operations described below can be performed by an AM system, such as, but not limited to, system 10 or system 110. Selected operations can be executed by the data processor or the controller of the AM system.

The method begins at 900 and continues to 901 at which dispensing instructions are obtained. The dispensing instructions can include modeling material dispensing instructions and support material dispensing instructions. The modeling material dispensing instructions can be obtained by executing method 400 as described above. The support material dispensing instructions can be obtained from the computer object data as known in the art. The method continues to 902 at which two or more modeling materials and one or more support material are dispensed by the dispensing heads of the AM system, based on the dispensing instructions, and are subsequently solidified, to sequentially form a plurality of hardened layers in a configured pattern corresponding to a shape of an object. The dispensing and solidification can be by any technique known in the art, such as, but not limited to, the technique described above with references to AM system 10 or AM system 110.

The method ends at 903.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find support in the following example.

EXAMPLE

Reference is now made to the following example, which together with the above descriptions illustrate some embodiments of the invention in a non-limiting fashion.

This Example describes a procedure suitable for assigning color-values, according to some embodiments of the present invention. Consider, for example, a pixel of the input color texture that stores a non-white color defined by a multibit word, namely a weighted combination of single-bit colors (e.g., Cyan, Magenta and Yellow). In the following example, colors that are other than white and black are assumed to be transparent. The weights forming the multibit word are summed to provide a total-area-coverage (TAC) that characterizes the multibit word. Optionally and preferably the weights are normalized to a predetermined range, for example, 0 to 1, prior to the summation. Thus, for example, suppose that after the normalization the multibit word includes a first weight $w_1$ corresponding to a first color (e.g., cyan), a second weight $w_2$ corresponding to a second color (e.g., magenta), and a third weight $w_3$ corresponding to a third color (e.g., yellow), $w_1, w_2, w_3 \in [0,1]$. The TAC is therefore $w_1+w_2+w_3$. It is noted that the value of the TAC, as calculated using weights that are normalized to the 0-1 range, need not be less than 1. In various exemplary embodiments of the invention for at least one pixel, the value of the TAC parameter is above 1, in various exemplary embodiments of the invention for at least one pixel, the value of the TAC parameter is above 2, and in various exemplary embodiments of the invention for at least one pixel, the value of the TAC parameter is above 3.

Figure 11A:
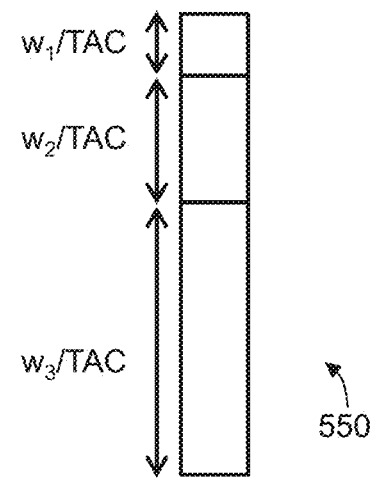
FIGS. 11A and 11B are schematic illustrations of a color stack and a color stack within a slice of computer object data, according to some embodiments of the present invention.

The proportion of each weight relative to the TAC is then calculated as the ratio between the respective weight and the TAC. This defines a stack of colors within the slice data, where the height of each color is represented by the proportion of the respective weight. FIG. 11A illustrates a stack 550 of colors corresponding to the proportions of weights $w_1$, $w_2$, and $w_3$.

Figure 11B:
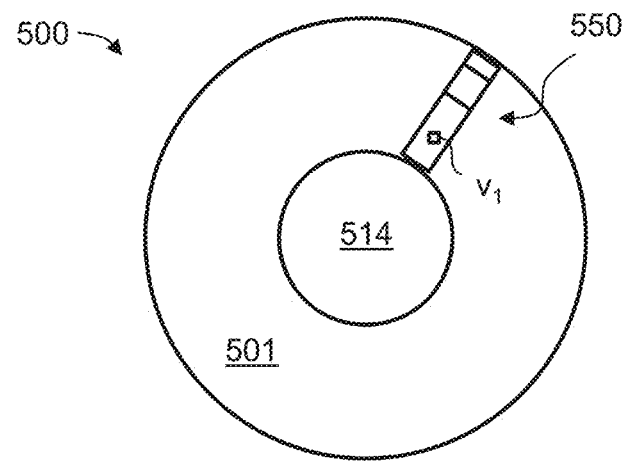

Each voxel in the slice data that is within the stack of colors is processed according to the color within the stack. FIG. 11B illustrates slice 500, wherein the stack 550 is defined with the mapped voxels 501. The processed voxel is marked by $v_1$. In the exemplified illustration $v_1$ is within the part of the stack that corresponds to the third color.

A random halftoning is then applied so as to define one or more probabilities for v1. The material to be dispensed is then set stochastically among the respective color(s) and a white opaque color, according to the defined probabilities. When $v_1$ contains an alpha component, the probability for white material that is associated with this voxel is reduced according to the alpha component, and am additional probability for a colorless clear material is defined.

As a more specific example, consider a situation in which a pixel has a CMY color composition of C20 M30 Y70. Following normalization, e.g., by dividing by 100, the corresponding weights for cyan, magenta and yellow are $w_1=0.2$, $w_2=0.3$, and $w_3=0.7$, respectively. The TAC parameter is therefore 1.2, and the proportions of the color stack are 0.167 for the cyan part of the stack, 0.25 for the magenta part of the stack, and 0.583 for the yellow part of the stack.

Now, suppose that it is desired to have an opaque value of C0.2. In this case, the stochastic process includes generating a random number in the range 0-1, wherein when the value of the random number is less than 0.2, $v_1$ is assigned with cyan, and when the value is 0.2 or more v1 is assigned with white.

Suppose that it is alternatively desired to have transparent value of C0.2 with an alpha value of 0.4. In this case the conditional probability for white color is 0.4, so that the probability for white is 0.8×0.4=0.32. The stochastic process can then include generating a random number in the range 0-1, wherein when the value of the random number is less than 0.2, the $v_1$ is assigned with cyan, when the value is between 0.2 and 0.2+0.32=0.52 $v_1$ is assigned with white, and when the value is 0.52 or more v1 is assigned with a clear colorless material.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of additive manufacturing of a three-dimensional object, by an additive manufacturing system loaded with a plurality of colored building materials and at least one non-colored building material, the method comprising:
   receiving computer object data having a three-dimensional grid of voxels collectively describing a shape of the three-dimensional object, and an input color texture to be visible over a surface of the object;
   for at least a portion of said voxels, classifying said voxel as being either a surface voxel or an internal voxel, wherein each surface voxel is associated with a group of internal voxels forming a receptive field for said surface voxel;
   for surface voxel and associated receptive field:
   determining a multi-component color for said surface voxel based on a local color of said input color texture corresponding to a location of said surface voxel, wherein each component of said multi-component color corresponds to a color of one colored building material, assigning said surface voxel and each voxel of said receptive field with one of said color components to define a color stack having a plurality of segments, each having a height that is proportional to a weight of one color component in said multi-component color and comprising all voxels that are assigned with said color component, and applying a halftoning procedure to each of said surface voxel and said receptive field voxels, to probabilistically designate said voxel with one building material selected from the group consisting of: a non-colored building material, and a colored building material having a color corresponding to a color component assigned to said voxel; and dispensing and solidifying said building materials by said additive manufacturing system according to said building material designations to sequentially form a plurality of hardened layers in a configured pattern corresponding to said shape of the three-dimensional object.

2. The method according to claim 1, comprising classifying each internal voxel as being either a receptive field or a core voxel, and designating each core voxel with a preselected building material.

3. The method according to claim 1, wherein the additive manufacturing system is loaded with an opaque non-colored building material and a clear non-colored building material, wherein said local color of said input color texture also comprises opacity information, wherein the method comprises assigning said surface voxel and each voxel of said receptive field with an alpha component corresponding to said opacity information, and wherein a probability of selecting said opaque non-colored building material and said clear non-colored building material is based on said alpha component.

4. The method according to claim 3, wherein said probability of selecting said opaque non-colored building material and said clear non- colored building material is also based on a curvature of said surface at said location of said surface voxel.

5. The method according to claim 1, wherein for at least one surface voxel, a sum of weights of all color components of said multi-component color is more than 1.

6. The method according to claim 1, comprising for at least one internal voxel, selecting a receptive field for said internal voxel from at least two receptive fields associated with different surface voxels.

7. The method according to claim 1, wherein each of at least a portion of said internal voxel of said group is closer to said surface voxel than to all other surface voxels.

8. The method according to claim 1, further comprising, determining a geometrical characteristic of said receptive field, wherein said assigning is also based on said geometrical characteristic.

9. The method according to claim 1, wherein for at least one receptive field voxel, said assignment is also based on color error information extracted from another voxel in said receptive field.

10. The method according to claim 1, wherein said assigned color has a lower level of gradation than said input color texture.

* * * * *